(12) United States Patent
Xu et al.

(10) Patent No.: US 6,175,778 B1
(45) Date of Patent: *Jan. 16, 2001

(54) COMPUTER VISION-BASED ROTOR MACHINING SYSTEM APPARATUS AND METHOD

(75) Inventors: Hong Xu, Charlotte; Donald Lee Burgoon, Gastonia, both of NC (US)

(73) Assignee: Performance Friction Corporation, Clover, SC (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/089,223

(22) Filed: Jun. 3, 1998

(51) Int. Cl.[7] .................................................. B29C 45/00

(52) U.S. Cl. ......................... 700/203; 700/227; 700/301; 700/304; 451/51; 409/131; 188/18 A; 188/380; 82/152

(58) Field of Search ................................... 700/303, 227, 700/301, 304; 188/218 A, 218, 218 R; 451/51, 44, 61, 63; 409/131, 132

(56) References Cited

U.S. PATENT DOCUMENTS

| | | | |
|---|---|---|---|
| 4,290,510 | * | 9/1981 | Warren ........................... 188/218 XL |
| 4,457,172 | * | 7/1984 | Mathes et al. ......................... 73/462 |
| 4,523,499 | * | 6/1985 | Aldridge, Jr. ............................. 82/112 |
| 4,531,434 | * | 7/1985 | Vasquez ................................... 82/152 |
| 4,657,649 | | 4/1987 | Hinman ........................... 204/224 M |
| 4,669,046 | * | 5/1987 | Kudo ....................................... 701/76 |
| 4,823,071 | | 4/1989 | Ding et al. ............................. 324/662 |
| 4,899,218 | | 2/1990 | Waldecker et al. ..................... 348/94 |
| 4,945,763 | | 8/1990 | Mueller ................................... 73/462 |
| 4,989,377 | * | 2/1991 | Junker ..................................... 451/51 |
| 5,046,361 | | 9/1991 | Sandstrom ............................. 73/460 |
| 5,077,806 | | 12/1991 | Peters et al. ......................... 382/141 |
| 5,125,187 | * | 6/1992 | Thiem ..................................... 451/63 |
| 5,239,486 | | 8/1993 | Mortier ................................. 702/184 |
| 5,327,782 | | 7/1994 | Sato et al. ............................... 73/129 |
| 5,352,305 | | 10/1994 | Hester ................................. 148/581 |
| 5,378,994 | | 1/1995 | Novak et al. ......................... 324/671 |
| 5,461,659 | * | 10/1995 | Siemers ................................. 378/129 |
| 5,480,007 | * | 1/1996 | Hartford ............................. 188/18 A |
| 5,485,678 | | 1/1996 | Wagg et al. ............................ 33/610 |
| 5,566,244 | | 10/1996 | Kato et al. ........................... 382/108 |
| 5,615,589 | * | 4/1997 | Roach ..................................... 82/112 |
| 5,657,233 | | 8/1997 | Cherrington et al. ............... 705/400 |
| 5,664,648 | * | 9/1997 | Hester ............................. 188/218 R |
| 5,717,595 | | 2/1998 | Cherrington et al. ............... 705/157 |
| 5,734,569 | | 3/1998 | Rogers et al. ......................... 701/33 |
| 5,766,057 | * | 6/1998 | Maack ..................................... 451/51 |
| 5,842,388 | * | 12/1998 | Visser et al. ........................... 82/1.11 |
| 5,918,707 | * | 7/1999 | Sanders, III ....................... 188/18 A |

OTHER PUBLICATIONS

Williamson et al., "Representation of rotor spiders in reduced finite–element models for cage rotors"., IEEE., pp. 72–76, 1995.*

* cited by examiner

*Primary Examiner*—William Grant
*Assistant Examiner*—Marc McDieunel
(74) *Attorney, Agent, or Firm*—Pillsbury Madison & Sutro LLP

(57) ABSTRACT

A system, apparatus and method for machining a rotor by determining a center plane of the rotor based two surfaces of the rotor, preferably two interior surfaces; positioning the rotor based on the determined center plane; and then machining the positioned rotor. The center plane of the rotor is determined using at least one image of the rotor. In some preferred embodiments, the center plane is determined using a series of successive images of the rotor. The center plane can be determined based on a measure of parallelism of two braking surfaces of the rotor or of two interior, non-braking surfaces of the rotor. Before and/or after the rotor is machined, it can also be inspected.

22 Claims, 4 Drawing Sheets

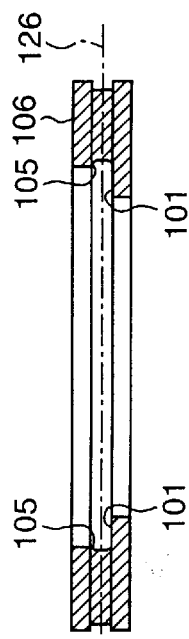
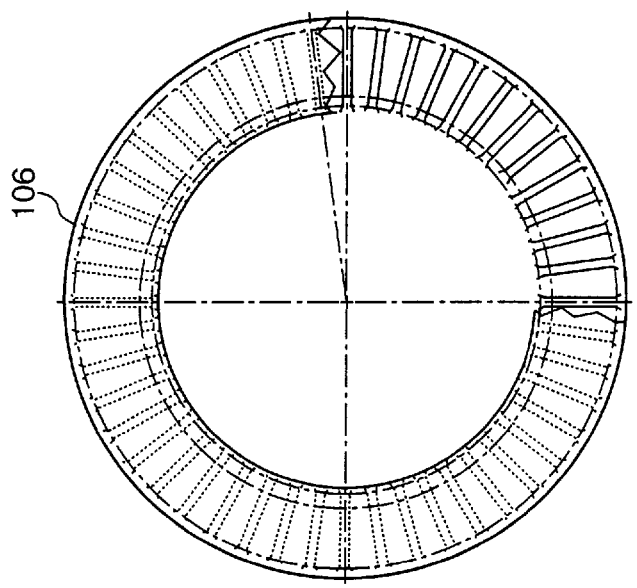
Fig. 5 (PRIOR ART)
Fig. 6 (PRIOR ART)
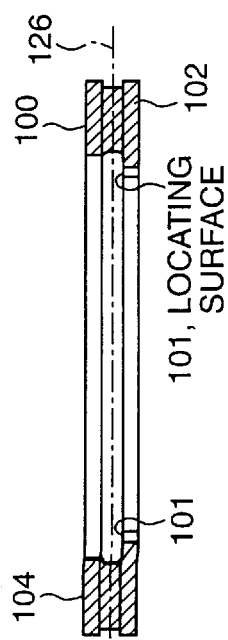
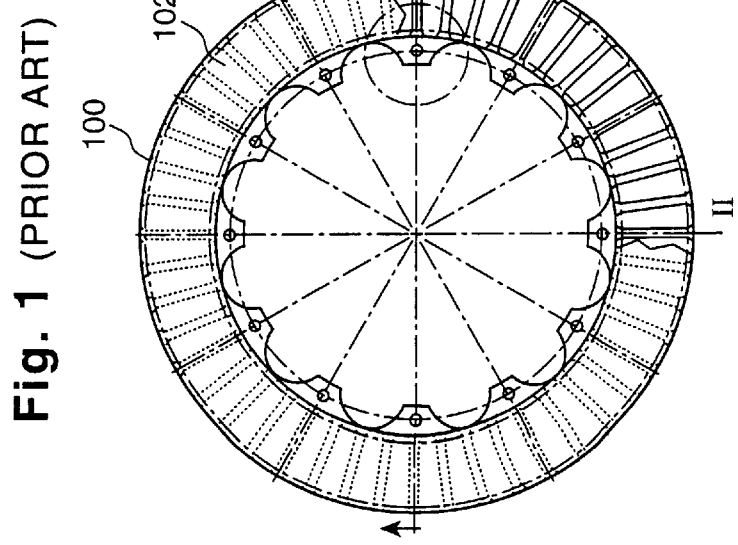
Fig. 1 (PRIOR ART)
Fig. 2 (PRIOR ART)

COMPUTER VISION-BASED ROTOR MACHINING SYSTEM APPARATUS AND METHOD

1. Field of the Invention

This invention relates machining rotors. More specifically, this invention relates to an apparatus and method for machining rotatable disc brake rotors in a new, improved and facilitated manner.

2. Background of the Invention

Motor vehicles use various mechanisms to facilitate braking. Well known among these braking mechanisms is a combination of a disc rotor connected to a wheel of the vehicle. In order to stop or slow the vehicle, pressure is applied by a brake caliper pressing brake pads against one or more outer surfaces of the disc rotor (e.g., using so-called disc brakes), thereby slowing or stopping the rotation of the shaft to which the rotor is connected, and thereby, simultaneously slowing or stopping the rotation of the wheels.

Some rotors have a veined construction. A typical veined rotor 100 is depicted in FIGS. 1 and 2, wherein FIG. 1 shows a front view and FIG. 2 shows a side view of the rotor 100. A portion of the rotor 100 (between the lines I and II) is cut away to show the inside veined structure of the rotor. The veined rotor essentially is made up of two disc plates separated and connected by a number of veins. The veins can be straight or curved and the number of veins varies from one rotor to another. For example, FIGS. 3 and 4 show an example of an unmachined veined rotor with curved veins. The rotor 100 has two outside braking surfaces 102, 104, these surfaces being provided by the outer surfaces of the two discs comprising the rotor. The rotor 100 also has two interior non-braking surfaces 101 and 105 which form the interior veined structure of the rotor along with the veins. It is against the two braking surfaces 102, 104 that pressure is applied (e.g., by brake pads (not shown)) in order to slow or stop the rotation of the wheel drive connected to the rotor 100. Ideally, the rotor 100 is perfectly circular and these outside braking surfaces 102, 104 are parallel to each other and flat, as are the interior non-braking surfaces 101, 105.

A typical rotor 100 is manufactured by machining a pre-cast rotor. A cast, pre-machined rotor 106 is shown in FIGS. 5 and 6 which depict front and side views of the pre-cast, un-machined rotor 100, respectively. The rotor 100 shown in FIGS. 1 and 2 is produced by appropriately machining the cast rotor 106.

A number of problems or defects can exist with existing rotors, and some of these problems or defects can be traced back to the manner in which the rotors were machined. For example, as noted above, in order to prevent or avoid uneven heat, uneven mass and uneven temperature and thermal distortion of the rotors surfaces, the surfaces 101, 102, 104 and 105 are ideally parallel, symmetrical and flat. In prior machining systems, neither the parallelism, the flatness, the center or the symmetry of these surfaces was determined prior to machining, nor were any of these features assured after machining.

SUMMARY OF THE INVENTION

This invention solves the above and other problems by providing a computer-vision based machining system which is able to determine the center plane of a pre-machined rotor and thereby to position the rotor accurately for machining. In particular, this invention solves these problems by determining the center plane between the two surfaces of the rotor, preferably two non-machinable interior non-braking surfaces of the rotor.

Accordingly, in one aspect, this invention provides a method of machining a rotor by determining a center plane of the two surfaces of the rotor; positioning the rotor based on the determined center plane; and then machining the positioned rotor. The center plane of the rotor is determined using at least one image of the rotor. In some preferred embodiments, the center plane is determined using a series of successive images of the rotor.

Preferably the center plane is determined based on a measure of two interior non-braking surfaces of the rotor.

After the rotor is machined, it can also be inspected by determining the parallelism between the center plane of the outer (braking) surfaces of the machined rotor and the previously determined center plane based on the interior surfaces. Before the rotor is machined it can be inspected for flatness and/or parallelism of the interior, non-braking surfaces. If, based on measures of their parallelism and/or flatness, these surfaces do not comply to specifications, the rotor can be rejected prior to machining.

In another aspect, this invention is a method of machining a brake rotor by positioning an unmachined rotor on a chuck of computer controlled turning center; determining a center plane of the rotor; adjusting the position of the rotor within the turning center based on the determined center plane of the brake rotor; and machining the brake rotor.

In yet another aspect, this invention is a system for machining a rotor. The system includes a turning center having a chuck for mounting the rotor thereon and positioning the rotor on one of the interior non-braking surfaces; an image frame grabber for obtaining images of the rotor; a computer system connected to the turning center and programmed to provide control information to the turning center based on information obtained from the images, wherein the computer system is programmed to determine a center plane of the rotor based on images of the rotor obtained by the image frame grabber. The frame grabber can obtain the images of the rotor while it is mounted on the chuck or when it is at some other location, e.g., on a conveyer system.

In some embodiments the computer system is further programmed to determine the center plane of the rotor based on a series of images of the rotor. The computer system can also be programmed to determine the center plane based on a measure of two non-braking interior surfaces of the rotor.

As noted, this invention overcomes a number of problems and defects with existing rotors. For example, the use of this invention prevents or minimizes uneven heat, uneven mass and uneven temperature and thermal distortion of rotors' surfaces, providing rotors with surfaces which are substantially parallel, symmetrical and flat and which have relatively uniform mass distribution.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIGS. 1 and 2 show typical rotors produced according to the present invention;

FIGS. 3 to 6 show castings used to produce rotors according to this invention;

DETAILED DESCRIPTION OF THE PRESENTLY PREFERRED EXEMPLARY EMBODIMENTS

Figure 4:
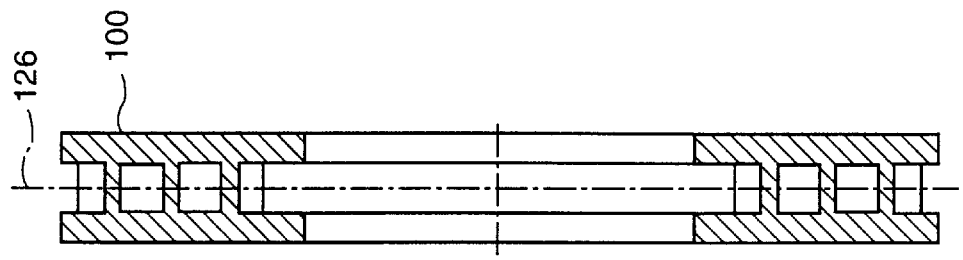
Figure 3:
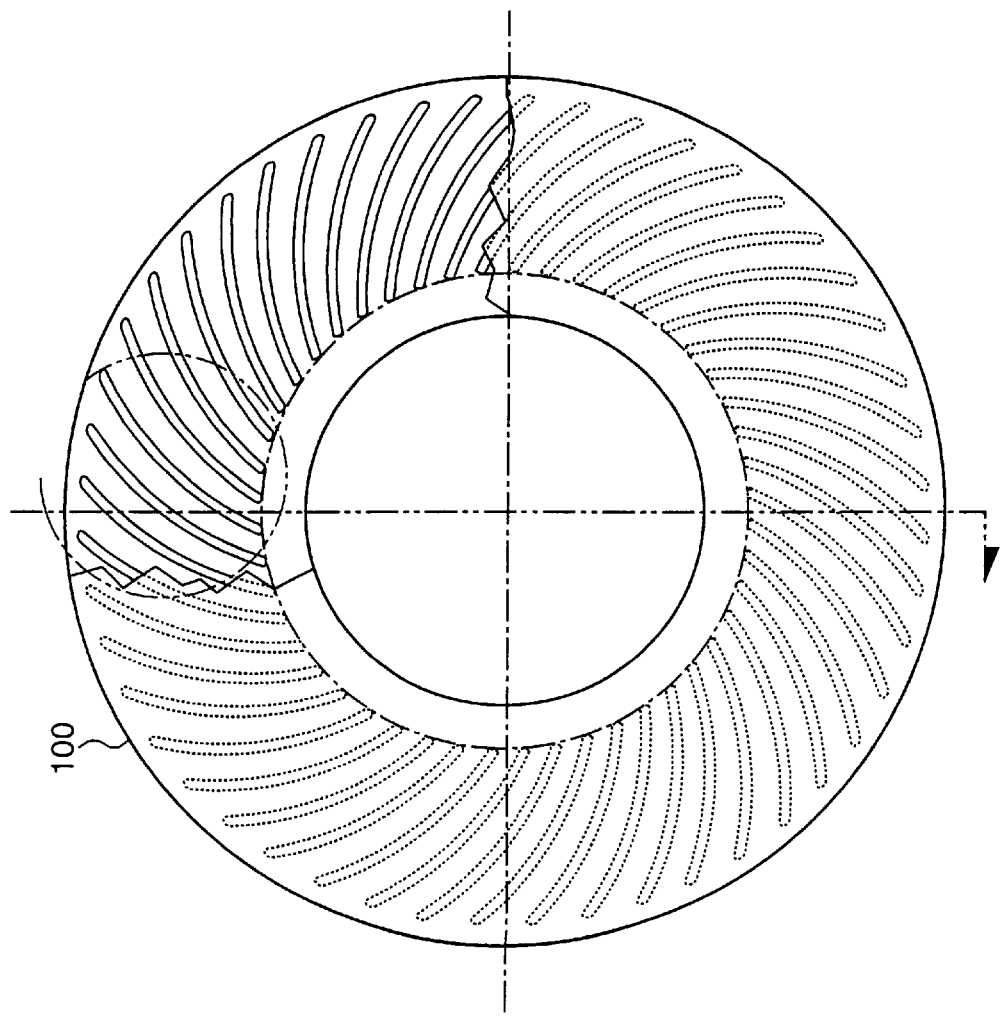
Figure 7:
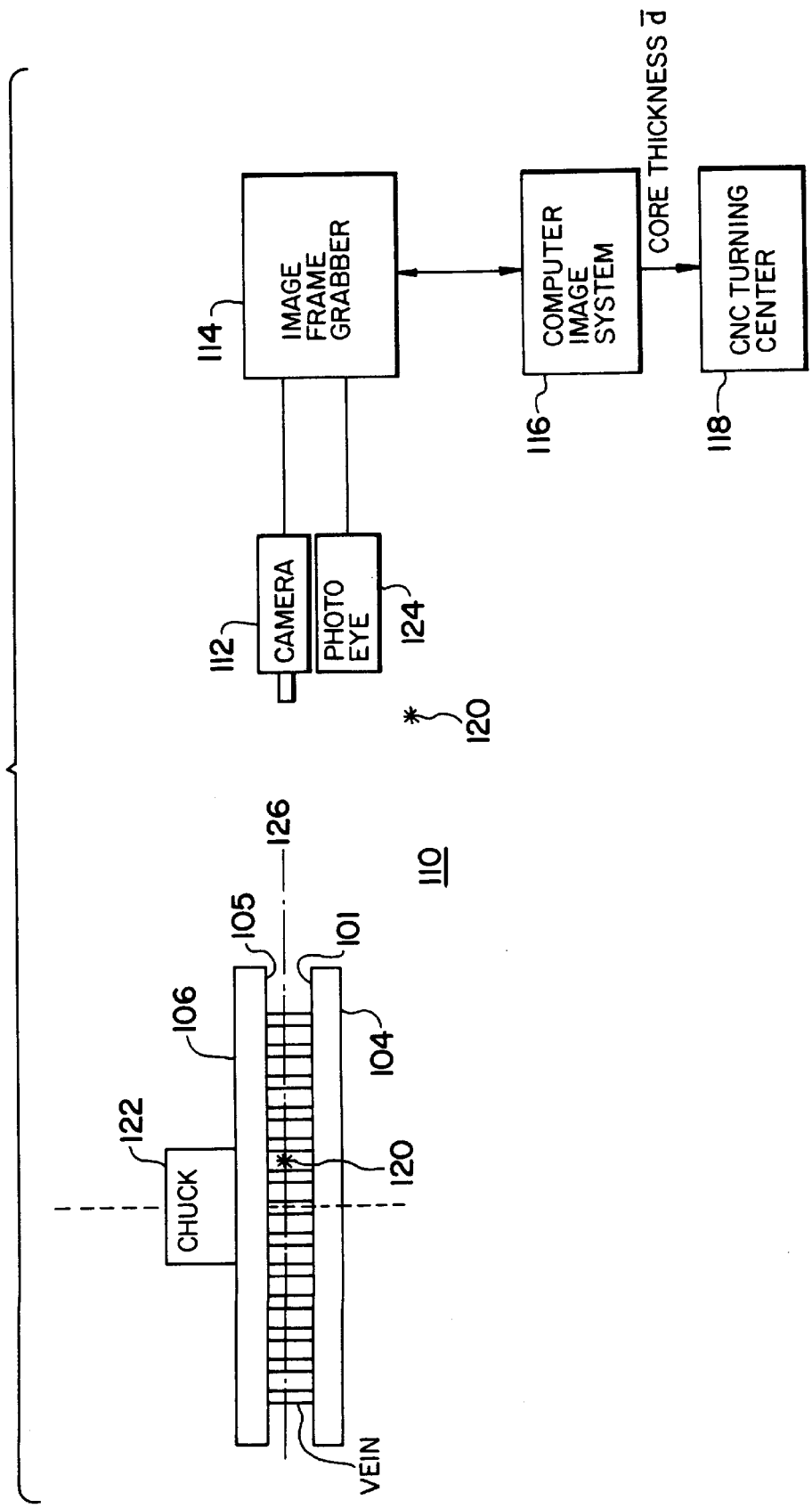
FIG. 7 show a machining system according to the present invention.

With reference to FIG. 7, a machining system 110 according to the present invention includes one or more cameras 112 connected to an image frame grabber 114. The image frame grabber 114 is connected to a computer image system 116 which is connected to and provides control information to a computer numeric controlled (CNC) turning center 118. One or more active or passive light sources 120 are positioned at positions relative to the cameras 112. The light sources 120 can be positioned to provide front or back lighting for the cameras 112. The light sources 120 can be any illumination or structured laser lighting system. If more than one camera is used, both front and back lighting can be used. The camera(s) 112 are positioned relative to the coordinate space of the machining system 110 such that a lens or input system of each camera has a side view of a rotor 106 mounted on a chuck 122 of the turning center 118. The position of each camera must be known in the coordinate space of the turning center 118.

As will now be described, the system 110 is used to measure at least some of the following features of the rotor 106 mounted on the chuck 122:

(a) core thickness, i.e., the distance between the interior non-braking surfaces 101, 105 of the rotor;

(b) flatness of an interior non-braking surface 101 of the rotor, which surface acts as a locating surface; and (c) parallelism of the two interior non-braking surfaces 101, 105 of the rotor.

Some or all of these measures are used by the system 110 to find an exact center plane 126 of the rotor 106 (based on the interior, non-braking surfaces 101, 105) and thereby to position the rotor 106 precisely before machining it. In the machining mode the center plane 126 is determined based on the interior, non-braking surfaces 101, 105 of the rotor 100.

Figure 8:
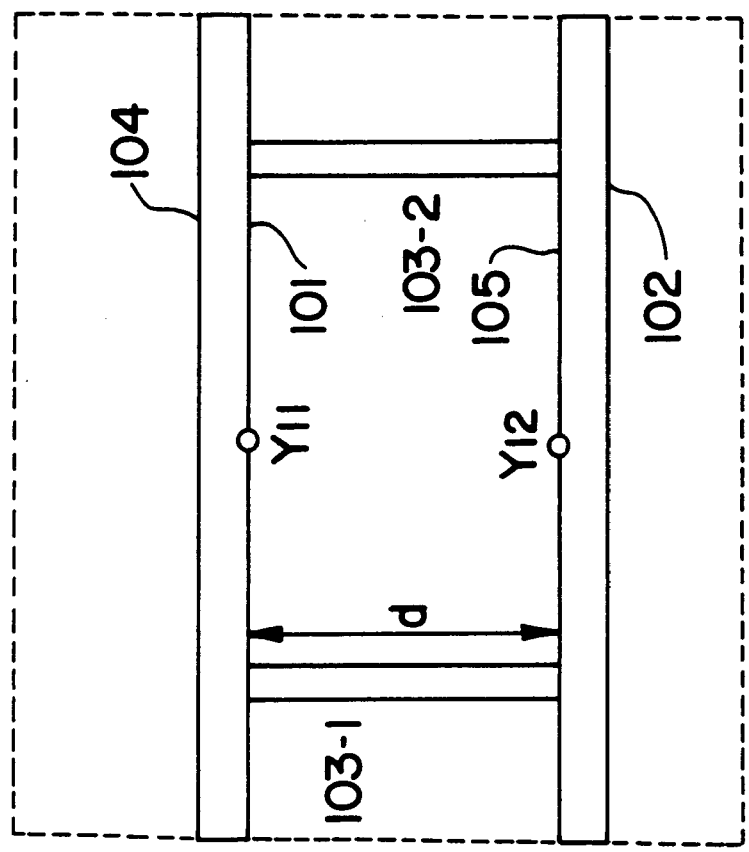
FIG. 8 shows a typical image used by the system of this invention.

In a machining mode, the chuck 122 with the rotor 106 mounted thereon is rotated at a relatively slow speed, e.g., 30–50 r.p.m., and successive images of the side view of the rotor 106 are taken by the image frame grabber 114 for processing by the computer image system 116. An example of one such image is shown in FIG. 8. The typical image shown in FIG. 8 preferably includes the interior (non-braking) surfaces 101, 105 of the rotor and one or two veins 103-1, 103-2 of the rotor. The images can be taken at known successive locations, at a rate dependent on the processing speed of the frame grabber 114 and the computer system 116 as well as on the rotation speed of the rotor. Preferably enough images are taken to obtain an accurate measurement of the entire outer surface of the rotor 106.

In some preferred embodiments, particularly when veined rotors are being machined, the system 110 includes a photo-eye 124 which senses passing vanes and triggers the frame grabber 114 to capture a window image formed by two vertical veins and the interior braking surfaces (e.g., as shown in FIG. 8).

The computer system 116 processes the images, each in turn, as it receives them from the frame grabber, and then provides the CNC turning center 118 with the appropriate control information to machine the rotor 106. In particular, the computer system 116 provides the turning center 118 with information about the center plane 126 of the rotor 106. The turning center then adjusts the vertical position of the rotor 106 accordingly, based on this center plane information, before machining it.

In the presently preferred embodiment, the computer image system 116 is a PC-based system, the image frame grabber 114 is an electronic device capable of capturing and transferring image information to the computer system 116, and the CNC turning center is a standard turning center, adapted to take input from the computer system 116. Typically the image frame grabber 114 is capable of grabbing forty to sixty frames per second. With this configuration, the system 110 is capable of measuring a rotor 106 and finding its center plane within about two seconds.

The camera(s) 112 can be area-scan or line-scan CCD cameras The lower the resolution of the camera, the less accurate the resulting measurements. In preferred embodiments a single camera with a resolution of 640×480 pixels is used. In another preferred embodiment, a single camera with 1,024×1,024 pixels (or any type of CCD (Charge-Coupled Device) camera with high resolution) is used. In yet another preferred embodiment, a so-called line-scan camera with, e.g., 4,096×1 pixels is used. In this latter case, the computer image system first combines a number of successive single line images into larger images for processing as a larger image. As noted above, more than one camera can be used and, when more than one camera is used, the different cameras can have different resolutions.

Recall that a goal of the system 110 is to determine the center plane 126 of the rotor 106 prior to machining it. This center plane 126 is determined based on the non-braking interior surfaces of the rotor 100, and is calculated as follows:

For each image I grabbed by the image frame grabber 114, the computer system 116 determines three values (with reference to FIG. 8):

(a) a Y coordinate of the upper edge of the interior non-braking surface 105 (designated $Y_{I1}$);

(b) a Y coordinate of the lower edge of the interior non-braking surface 101 (designated $Y_{I2}$); and (c) the core thickness (designated $d_I$).

Preferably $Y_{I1}$ is the Y coordinate of the center of the best fit of the upper edge of the interior non-braking surface 105. In some embodiments, $Y_{I1}$ can be any point along the upper edge of the surface 105. Similarly, preferably $Y_{I2}$ is the Y coordinate of the center of the best fit of the lower edge of the interior non-braking surface 101, however, in some embodiments $Y_{I2}$ can be any point along the lower edge of the interior surface. In some embodiments the points $Y_{I1}$, and/or $Y_{I2}$ can be determined based on an average of two or more points located on the upper and lower edges respectively. For example, $Y_{I1}$ can be determined as the average of three or five points on the upper edge. It is understood that if fewer points are used to determine the values of $Y_{I1}$ and/or $Y_{I2}$, the overall accuracy of the flatness and parallelism is correspondingly diminished. It is contemplated that in some embodiments a single point can be located on each edge and used as the corresponding Y coordinate.

Assume for the sake of this explanation that N images are grabbed and processed. Given these three values ($Y_{I1}$, $Y_{I2}$ and $d_I$) for each of the N images grabbed, the computer system 116 determines the following:

The average core thickness:

$$\bar{d} = \frac{1}{N}\sum_{i=1}^{N} d_i$$

The flatness of the lower interior surface (the locating surface):

max $(Y_{f2})$–min $(Y_{f2})$, $i=1 \ldots N$

The parallelism between the interior braking surface:

max $(Y_{f1})$–min $(Y_{f1})$, $i=1 \ldots N$

The average core thickness is then provided to the turning center to establish the symmetrical plane of the two interior surfaces by offsetting 50% of the average core thickness from the locating surface, usually one of the interior braking surfaces. A cut can then be made on the braking surface to achieve symmetry and uniform braking thickness. Thus, with the center plane 126 located, as described above, the chuck 122 is appropriately moved in the vertical (Y) plane before machining of the rotor begins.

While the above process has been described with respect to the non-braking interior surfaces, in some embodiments the center plane, flatness and parallelism are determined using the outside (braking) surfaces. These embodiments can be used alone or in conjunction with those using the interior surfaces.

Once machining of a rotor is complete, the system 110 can then be used in an inspection mode to determine whether or not the rotor 106 was machined according to specifications and requirements. If not, the turning system 118 can continue processing the rotor to correct problems detected by the inspection. Since the inspection can take place while the rotor is still on the chuck 122, there is no loss of position accuracy from having to re-mount the rotor on the turning center 118. In this manner, an inspection/feedback loop is achieved.

In the inspection mode, the center plane 126 is calculated based on the machined outer surfaces 102, 104, and then the newly calculated plane is compared to the initially calculated plane. That is, the plane calculated based on the outer, machined braking surfaces 102, 104, is compared to the plane calculated based on the interior, non-braking surfaces 101, 105. If the two planes are not the same (within some prescribed tolerance), the system can reject the rotor or re-machine it.

Thus, a computer vision-based rotor machining system, apparatus and method are provided. One skilled in the art will appreciate that the present invention can be practiced by other than the described embodiments, which are presented for purposes of illustration and not limitation, and the present invention is limited only by the claims that follow.

We claim:

1. A method of machining a rotor comprising:
   determining a center plane of the rotor based on two surfaces of the rotor, at least one of the surfaces being an interior surface of the rotor;
   positioning the rotor based on the determined center plane; and
   machining the positioned rotor.

2. A method as in claim 1 wherein the center plane of the rotor is determined using at least one image of the rotor.

3. A method as in claim 1 wherein the center plane of the rotor is determined using a series of successive images of the rotor.

4. A method as in claim 3 wherein the center plane is determined based on a measure of a property of the two surfaces of the rotor.

5. A method as in claim 4 wherein the property is the parallelism of the two surfaces.

6. A method as in claim 1 further comprising, after the rotor is machined,
   inspecting the rotor by determining the center plane of the machined rotor based on two outer surfaces of the rotor.

7. A method as in claim 6 further comprising:
   comparing the center plane determined from the outer braking surfaces with the center plane determined based on the interior non-braking surfaces.

8. A method as in claim 1 further comprising:
   inspecting interior, non-braking surfaces of the rotor.

9. A method as in claim 8 wherein the inspecting takes place prior to the machining, and wherein no machining takes place if the rotor fails inspection.

10. A method as in claim 8 wherein the inspecting of the surfaces considers at least one of (a) the flatness of the surfaces and (b) the parallelism of the surfaces.

11. A method as in any one of claims 1–7 wherein both of the surfaces are interior surfaces of the rotor.

12. A method of machining a brake rotor comprising:
    positioning an unmachined rotor on a chuck of computer controlled turning center;
    determining a center plane of the rotor based on at least two surfaces of the rotor, at least one of the surfaces being an interior surface of the rotor;
    adjusting the position of the rotor within the turning center based on the determined center plane of the brake rotor; and
    machining the brake rotor.

13. A method as in claim 12 wherein both of the surfaces are interior surfaces of the rotor.

14. A system for machining a rotor comprising:
    a turning center having a chuck for mounting the rotor thereon;
    an image frame grabber for obtaining images of the rotor;
    a computer system connected to the turning center and programmed to provide control information to the turning center based on information obtained from the images, wherein the computer system is programmed to determine a center plane of the rotor based on images of the rotor obtained by the image frame grabber, the determining of the center plane being based on at least an interior surface of the rotor.

15. A system as in claim 14 wherein the image frame grabber obtains images of the rotor while the rotor is mounted on the chuck.

16. A system as in claim 15 wherein the computer system is further programmed to determine the center plane based on a measure of a property of two surfaces of the rotor.

17. A system as in claim 16 wherein the property is selected from:
    (a) parallelism of two interior surfaces of the rotor; and
    (b) parallelism of two outer braking surfaces of the rotor.

18. A system as in claim 14 wherein the computer system is further programmed to determine the center plane of the rotor based on a series of images of the rotor.

19. A system as in claim 14 wherein the image frame grabber obtains images of the rotor while the rotor is mounted on the chuck.

20. A system as in claim 19 wherein the rotor is a veined rotor and wherein the system further comprises a photo eye for triggering the image frame grabber based upon detection of a vein of the rotor.

21. A computer-controlled turning center for machining a brake rotor, the turning center comprising:
   a computer image system constructed and adapted to provide information to the turning center;
   an image frame grabber operatively connected to the computer image system to provide images thereto;
   a camera connected to the image frame grabber, the camera positioned to obtain images of a rotor mounted on a chuck of the turning center,
   wherein the computer image system is programmed to determine a center plane of a rotor mounted on the turning center by analyzing images of the rotor taken by the camera.

22. A turning center as in claim 21 wherein the computer system is further programmed to provide data to the turning center regarding a desired position of the rotor based on the determined center plane of the rotor.

* * * * *